(12) United States Patent
Liu

(10) Patent No.: US 10,701,313 B2
(45) Date of Patent: *Jun. 30, 2020

(54) VIDEO COMMUNICATION DEVICE AND METHOD FOR VIDEO COMMUNICATION

(71) Applicant: Beijing FUNATE Innovation Technology Co., LTD., Beijing (CN)

(72) Inventor: Liang Liu, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,682

(22) Filed: Mar. 28, 2019

(65) Prior Publication Data

US 2019/0306460 A1  Oct. 3, 2019

(30) Foreign Application Priority Data

Mar. 28, 2018 (CN) .......................... 2018 1 0265871

(51) Int. Cl.
*H04N 7/14* (2006.01)
*G06T 7/73* (2017.01)
*G06K 9/00* (2006.01)

(52) U.S. Cl.
CPC ......... *H04N 7/147* (2013.01); *G06K 9/00228* (2013.01); *G06K 9/00604* (2013.01); *G06T 7/73* (2017.01); *H04N 7/144* (2013.01)

(58) Field of Classification Search
CPC ........ H04N 1/00299; H04N 1/42; H04N 7/14; H04N 7/141; H04N 7/142; H04N 2007/145

USPC ........................................... 348/14.01–14.09
See application file for complete search history.

(56) References Cited

U.S. PATENT DOCUMENTS 9,462,223 B2    10/2016  White
2008/0043100 A1*  2/2008  Sobel .................. H04N 9/3194
                                                348/139
2009/0102763 A1   4/2009  Border et al.
2009/0278913 A1  11/2009  Rosenfeld et al.
(Continued)

FOREIGN PATENT DOCUMENTS

CN        203966475    11/2014
EP          2509309    10/2012
(Continued)

*Primary Examiner* — Maria El-Zoobi
(74) *Attorney, Agent, or Firm* — ScienBiziP, P.C.

(57) ABSTRACT

A local video communication device includes a local translucent display device and a plurality of local cameras, the local translucent display device is configured to display remote video information from a remote video communication device; and the plurality of local cameras configured to capture a local video information; wherein the plurality of local cameras are placed on the back of the local translucent display device, and the plurality of local cameras are arranged in a two-dimensional camera array, and the local translucent display device further comprises a micro processing unit, wherein the micro processing unit comprises: a video capture and processing module, a location acquisition module configured to obtain the local user's face location, a communication module configured to communicate with the remote video communication device, and a display module configured to display the remote video information.

15 Claims, 19 Drawing Sheets

(56) References Cited

U.S. PATENT DOCUMENTS

| | | | |
|---|---|---|---|
| 2012/0257020 A1* | 10/2012 | Yee | G01S 17/89 |
| | | | 348/46 |
| 2015/0085116 A1* | 3/2015 | Graumann | B60R 11/04 |
| | | | 348/148 |
| 2016/0183144 A1* | 6/2016 | Vallabhu | H04W 36/0011 |
| | | | 370/331 |
| 2017/0264865 A1 | 9/2017 | Huangfu | |
| 2018/0161231 A1* | 6/2018 | Tse | A61H 99/00 |
| 2019/0037170 A1* | 1/2019 | Zimmerman | H04N 5/232 |

FOREIGN PATENT DOCUMENTS

| | | |
|---|---|---|
| TW | I248021 | 1/2006 |
| TW | 200923495 | 6/2009 |
| TW | 200948070 | 11/2009 |

\* cited by examiner action 1701: obtaining remote video information from the remote video communication device 10' action 1702: displaying the remote video information on the local translucent display device 11 action 1703: acquire the position of remote user's image displayed on the local translucent display device 11 action 1704: moving the local camera 12 to a position corresponding to the position of remote user's image displayed on the local translucent display device 11 action 1705: capturing local video information by the local camera 12, and transmitting the local video information to the remote video communication device 10'

FIG.17

VIDEO COMMUNICATION DEVICE AND METHOD FOR VIDEO COMMUNICATION

CROSS-REFERENCE TO RELATED APPLICATIONS

This application is related to applications entitled, "VIDEO COMMUNICATION DEVICE AND METHOD FOR VIDEO COMMUNICATION", filed Mar. 28, 2019, "VIDEO COMMUNICATION DEVICE AND METHOD FOR VIDEO COMMUNICATION", filed Mar. 28, 2019 US72425), and "WINDOW SYSTEM BASED ON VIDEO COMMUNICATION", filed Mar. 28, 2019, and "VIDEO COMMUNICATION DEVICE AND METHOD FOR VIDEO COMMUNICATION", filed Mar. 28, 2019.

FIELD

The subject matter herein generally relates to a video communication device.

BACKGROUND

With the development of the communication technology, video communication has been widely used in work places and people's lives in general, such as remote video conference of a company, video chat with friends from different places. However, users of a remote video communication system cannot look directly into each other's eyes. The reason is that the eyes displayed on the display are spaced apart from the camera. As a result, users cannot make direct eye contact with each other when using the remote video communication system, thereby undermining the communication experience. At the same time, a video player can only be used to display video and cannot display different videos or views according to users' different visual directions.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views. Implementations of the present technology will be described, by way of example only, with reference to the attached figures

FIG. 17 is a flow chart of an embodiment of a method for video communication.

DETAILED DESCRIPTION

Figure 1:
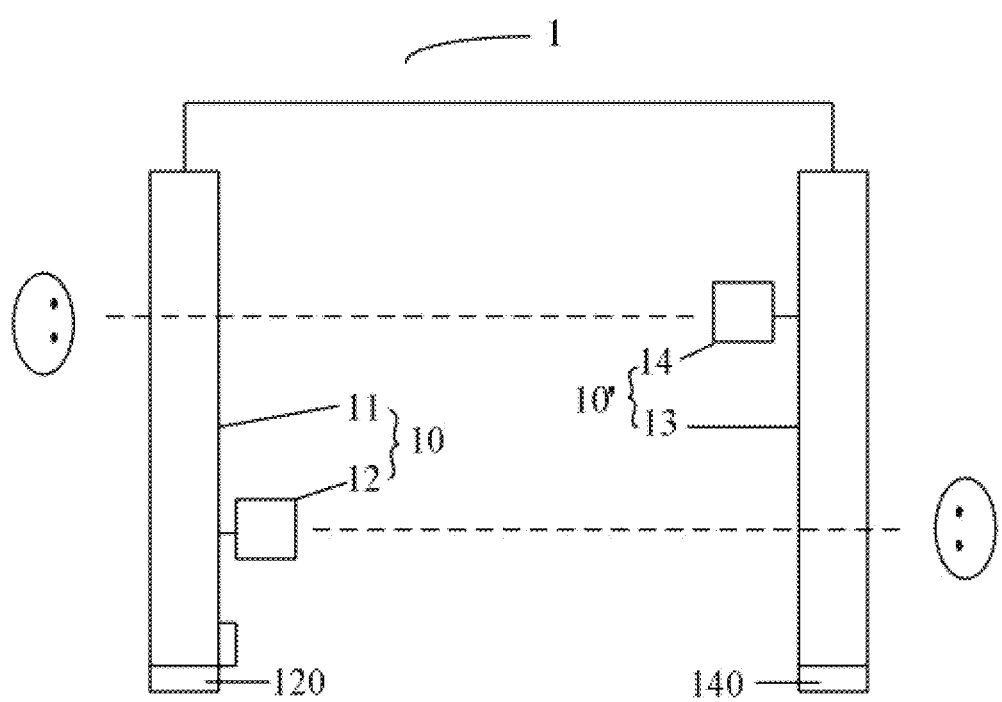
FIG. 1 is a schematic view of an embodiment of a video communication system.

It will be appreciated that for simplicity and clarity of illustration, where appropriate, reference numerals have been repeated among the different figures to indicate corresponding or analogous elements. In addition, numerous specific details are set forth to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to better illustrate details and features. The description is not to be considered as limiting the scope of the embodiments described herein.

Several definitions that apply throughout this disclosure will now be presented.

The connection can be such that the objects are permanently connected or releasably connected. The term "substantially" is defined to be essentially conforming to the particular dimension, shape, or other feature that the term modifies, such that the component need not be exact. The term "comprising" means "including, but not necessarily limited to"; it specifically indicates open-ended inclusion or membership in a so-described combination, group, series, and the like. It should be noted that references to "an" or "one" embodiment in this disclosure are not necessarily to the same embodiment, and such references mean "at least one."

In FIG. 1, an embodiment of a video communication system 1 is provided. The video communication system 1 comprises a local video communication device 10 and a remote video communication device 10'. The local video communication device 10 and the remote video communication device 10' are connected with each other through wired and/or wireless connections, and used for video communication. The local video communication device 10 comprises a local translucent display device 11 and a local camera 12. The remote video communication device 10' comprises a remote translucent display device 13 and a remote camera 14. The local camera 12 is movable following the position of a remote user's eyes image displayed on the local translucent display device 11, so that the position of the local camera 12 always corresponds to the position of the remote user's eyes image displayed on the local translucent display device 11. The remote camera 14 is movable following the position of the local user's eyes image on the remote translucent display device 13, so that the position of the remote camera 14 always corresponds to the position of the local user's eyes image on the remote translucent display device 13. Since the local video communication device 10 and the remote video communication device 10' have the same structure and functionalities, only the structure and functionalities of the local video communication device 10 are described in detail below.

Figure 2:
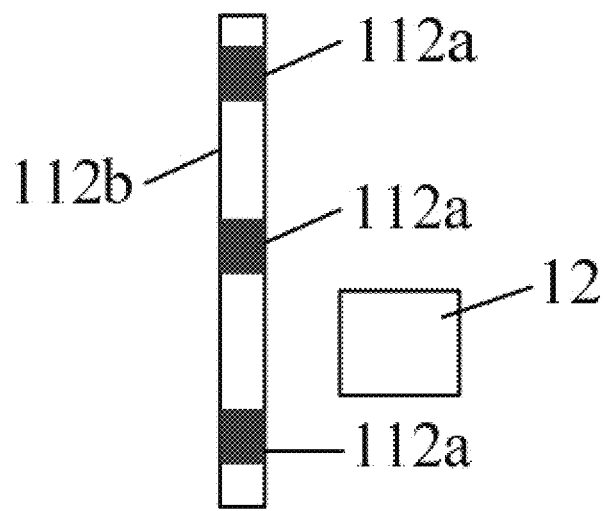
FIG. 2 is a schematic view of an embodiment of a translucent display.

The local translucent display device 11 is used to display remote video information. The remote video information is captured by the remote camera 14 and transmitted to the local translucent display device 11. The local translucent display device 11 is translucent, so that objects in front of the translucent display device 11 may be captured from the back of the translucent display device 11. The local translucent display device 11 may include a translucent display. The local translucent display device 11 may also include a display and a pellicle mirror. The local translucent display device 11 may also include a projector and a translucent projection screen. In FIG. 2, in one embodiment, the local translucent display device 11 is a translucent display. The translucent display comprises a plurality of pixel units 112*a* spaced from one another, and an area between two adjacent pixel units 112*a* is defined as an interval area 112*b*. The interval areas 112*b* are transparent so that light may pass through the interval areas 112*b*. The pixel units 112*a* are non-transparent for displaying video information. The scene (e.g., objects) in front of the translucent display may be captured by human eyes or the local camera 12 on the back of the translucent display through the interval areas 112*b*.

Figure 3:
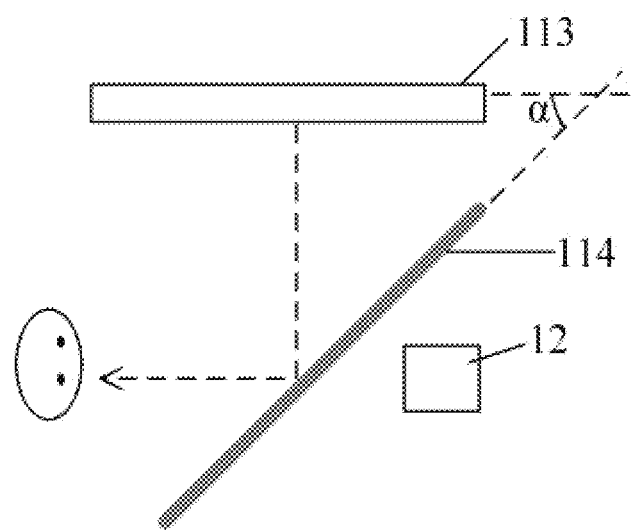
FIG. 3 is a schematic view of an embodiment of a translucent display device having a common display and a pellicle mirror.

In FIG. 3, in other embodiment, the local translucent display device 11 may include a common display 113 and a pellicle mirror 114. The pellicle mirror 114 is placed in front of and spaced from the common display 113. An angle α between the pellicle mirror 114 and the common display 113 is greater than 0 degree and less than 90 degrees. In one embodiment, the angle α is in a range of 30 degrees to 60 degrees. In one embodiment, the angle α is 45 degrees. The pellicle mirror 114 may change and/or alter the route of light to reflect the screen displayed by the common display 113 into the user's eyes, then the user is able to see the image displayed by the common display 113. In use, the user and the common display 113 are located on the same side of the pellicle mirror 114, and the local camera 12 is located on the other side of the pellicle mirror 114, and the local camera 12 may capture the user's video information through the pellicle mirror 114.

Figure 4:
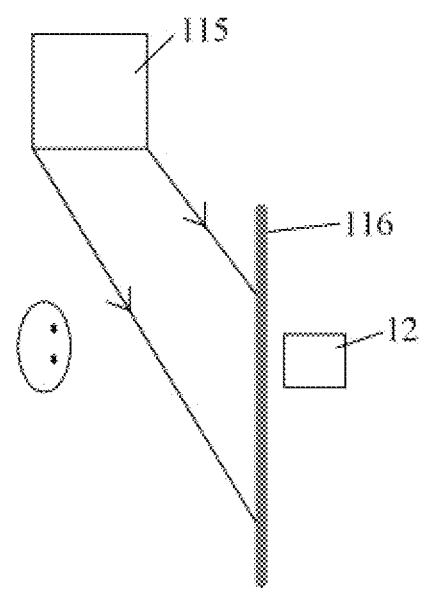
FIG. 4 is a schematic view of an embodiment of a translucent display device having a projector and a translucent projection screen.

In FIG. 4, in other embodiment, the local translucent display device 11 may include a projector 115 and a translucent projection screen 116. The video information of the projector 115 is projected onto the translucent projection screen 116 so that the user can see the video information displayed on the translucent projection screen 116. Since the projection screen is translucent, the local camera 12 on the back of the translucent projection screen 116 may capture video information of the user in front of the translucent projection screen 116.

Figure 5:
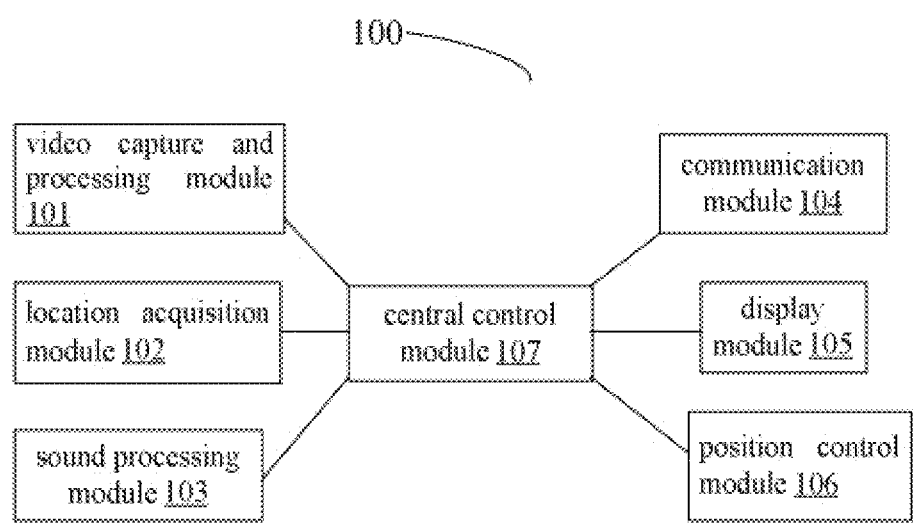
FIG. 5 is a schematic view of an embodiment of a micro processing unit.

The local video communication device 10 further comprises a micro processing unit 100. In FIG. 5, the micro processing unit 100 comprises a video capture and processing module 101, a location acquisition module 102, a sound processing module 103, a communication module 104, a display module 105, a position control module 106, and a central control module 107. The video capture and processing module 101 is used to capture and process local video information. Processing the local video information includes clipping the video information, correcting distorted video information, and calculating the occlusion relationship of the scene. The location acquisition module 102 is used to obtain the local user's face location. In one embodiment, the location acquisition module 102 may be used to obtain the local user's eyes location. The sound processing module 103 may be used to control the sound playback of video information and to capture local sounds. The communication module 104 may be used to communicate with the remote video communication device 10', such as receiving video information and location information from the remote video communication device 10', transmitting video information and location information to the remote video communication device 10'. The display module 105 may be used to display the remote video information. The position control module 106 may be used to control the position and angle of the local camera 12 according to the position information of the remote user's eyes on the local translucent display device and move the local camera 12 to the corresponding position. The central control module 107 may be used to coordinate and control the other modules. The location information obtained by the location acquisition module 102 may be transmitted to the video capture and processing module 101 by the central control module 107, thereby a video information conforming to a three-dimensional relationship can be generated. The local translucent display device 11 may include a smart TV or an All-in-one PC.

The local camera 12 may be used to capture local video information. And the local video information can be transmitted to the remote video communication device 10'. The local camera 12 is placed on the back of the local translucent display device 11. Since the local translucent display device 11 is translucent, the local camera 12 can capture the scene of the local user in front of the local translucent display device 11. The local camera 12 may include a movable camera. The local camera 12 may move and rotate under the control of the position control module 106. The local camera 12 may move freely in a plane parallel to the local translucent display device 11. A distance between the local camera 12 and the local translucent display device 11 can be adjusted as needed, as long as the local camera 12 does not touch the local translucent display device 11 and can be used to capture the scene in front of the local translucent display device 11. The position of the local camera 12 may be changed as the movement of the remote user's image displayed on the local translucent display device 11, so that the position of the local camera 12 always corresponds to the position of the remote user's image. In one embodiment, the position of the local camera 12 always corresponds to the position of the remote user's face image. In one embodiment, the position of the local camera 12 always corresponds to the position of the remote user's eyes image, so that the local user and the remote user can look directly at each other. The local camera 12 is equivalent to the eyes of the remote user. When the remote user moves, the local camera 12 also moves accordingly, and video captured by the local camera 12 also changes accordingly. Therefore, the video seen by the remote user is also constantly changed while the remote user moves.

Furthermore, the position of the local camera 12 can also be directly transmitted to the local video communication device 10 via the remote video communication device 10'. When the remote user moves, the remote video communication device 10' transmits the remote user's location information to the position control module 106 of the local video communication device 10. The remote user's location information can be calculated according to the remote user's image captured by the remote camera 14 and the position of the remote camera 14. The local camera 12 may move to a position of the remote user's image according to the remote user's position to capture the local video, and transmit the local video to the remote translucent display device 13. Thus, the remote user can have a true immersive experience.

Figure 6:
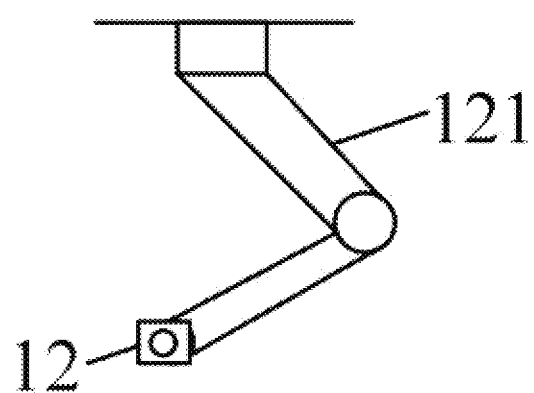
FIG. 6 is a schematic view of an embodiment of a robotic arm for moving a camera.
Figure 7:
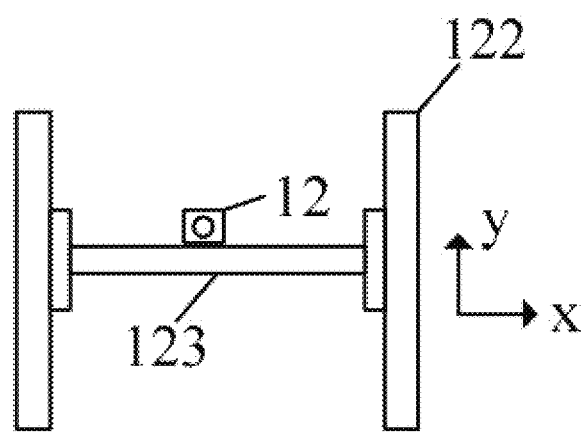
FIG. 7 is a schematic view of an embodiment of a trussed x-y mobile shelf for moving a camera.
Figure 8:
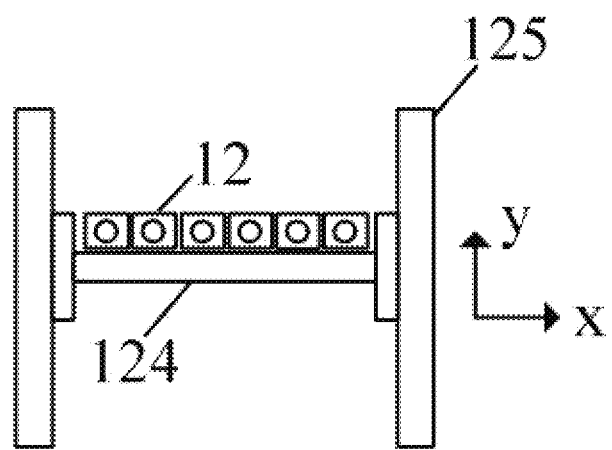
FIG. 8 is a schematic view of an embodiment of a trussed y mobile shelf for moving cameras.

The local camera 12 may move in the following ways. In FIG. 6, the local camera 12 may be fixed on a robotic arm 121 and moved by driving the robotic arm 121, so that the local camera 12 can move freely in all directions in its plane. In FIG. 7, the local camera 12 may be fixed on a trussed x-y mobile shelf 122. The trussed x-y mobile shelf 122 includes a beam 123, and the beam 123 may move along the y direction. The local camera 12 itself may move on the beam 123 along the x direction. Thus, the local camera 12 can move freely in its plane. The beam 123 may be replaced by a column. In FIG. 8, a plurality of local cameras 12 can be placed on a trussed y mobile shelf 125. The trussed y mobile shelf 125 includes a beam 124, and the beam 124 can move along the y direction. The plurality of local cameras 12 is placed side by side on the beam 124. The plurality of local cameras 12 are fixed along the x direction. The video capture and processing module 101 may select video information of one or more of the plurality of local cameras 12 and calculate the video information to generate a video. And the location of the one or more of the plurality of local cameras 12 may correspond to the position of the remote user's eyes. Thus, the video is what the remote user can see at the position of the remote user.

Figure 9:
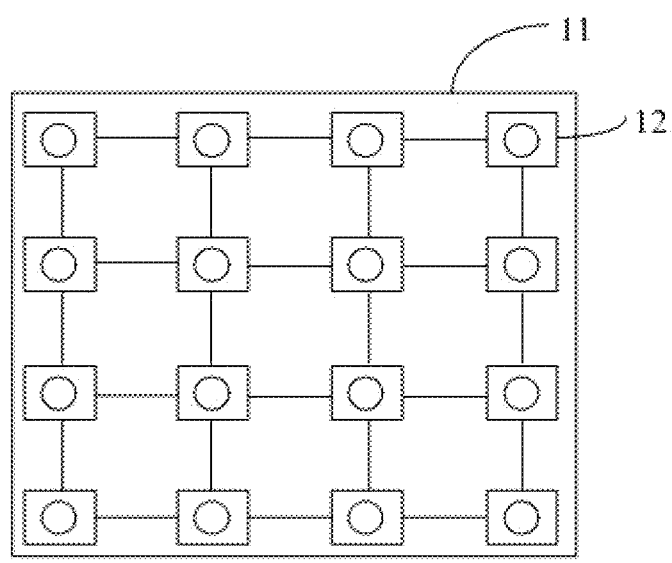
FIG. 9 is a schematic view of an embodiment of local camera array.

In FIG. 9, the plurality of local cameras 12 may be further arranged in a two-dimensional camera array. The two-dimensional camera array is distributed on the back of the local translucent display device 11, where the position of each local camera 12 is fixed. The plurality of local cameras 12 may work simultaneously. For example, the video capture and processing module 101 controls the plurality of local cameras 12 to work simultaneously, selects video information of one or more of the plurality of local cameras 12, and calculates the video information to generate a video image. The location of the one or more of the plurality of local cameras 12 may correspond to the position of the remote user's face image. The plurality of local cameras 12 may also work selectively, the video capture and processing module 101 may select one or more of the plurality of local cameras 12 to work, and the location of the one or more of the plurality of local cameras 12 may correspond to the position of the remote user's face image.

Figure 10:
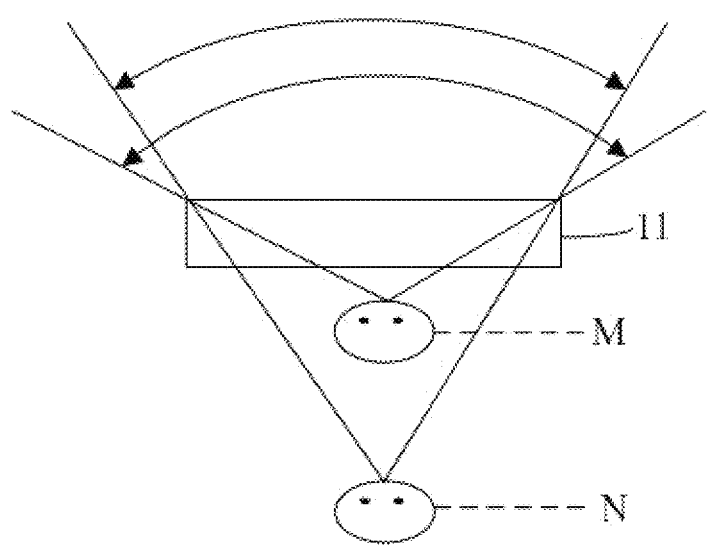
FIG. 10 is a schematic view of an embodiment of user's location and user's field of view.

The local camera 12 may include a binocular camera. The binocular camera may simulate the binocular vision of human eyes to capture scene information, and calculate the scene information in three dimensions to obtain the depth information of the scene. For example, the depth information between a local user and the local translucent display device 11 may be obtained by the local camera 12, then the depth information may be transmitted to the remote video communication device 10', and the remote video communication device 10' may select the video information according to the depth information. In FIG. 10, when the local user is located at the position M in front of the local translucent display device 11, the local user's field of view is large. When the local user is located at the position N in front of the local translucent display device 11, the local user's field of view becomes smaller than that at position N. The remote camera 14 is equivalent to the local user's eyes. The local user may move back and forth in front of the local translucent display device 11, but the distance between the remote camera 14 and the remote translucent display device 13 is constant, thus the remote camera 14 needs to shoot a large field of view for selection. In one embodiment, the viewing angle of the remote camera 14 reaches 180 degrees. The display module 105 may select the corresponding video information from a large field of view according to the location of the local user. In one embodiment, the local camera 12 and the remote camera 14 may include cameras with wide-angles and/or high-pixels.

Furthermore, the depth information can may be obtained by the location acquisition module 102, or by calculating data using cloud computing, and the data is send to the cloud by the location acquisition module 102. The transmission of the depth information may be performed by the communication module 104. The local camera 12 may further include four camera units arranged in a crossover manner, for example, to calculate the occlusion relationship in the vertical direction. The local video communication device 10 may further include a depth sensor 120 to specifically sense the depth information.

Figure 11:
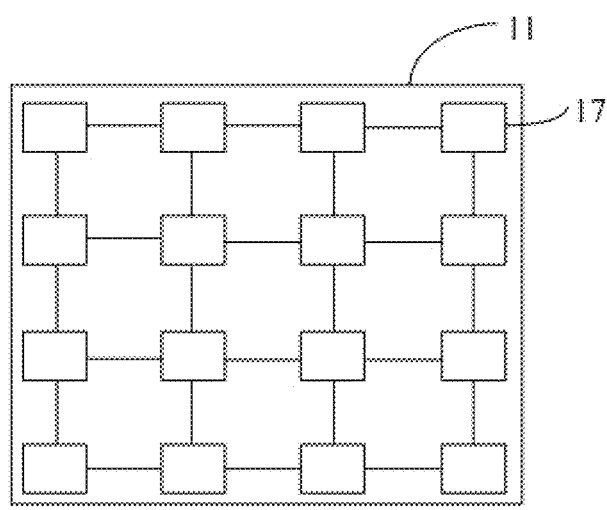
FIG. 11 is a schematic view of an embodiment of speaker array.
Figure 12:
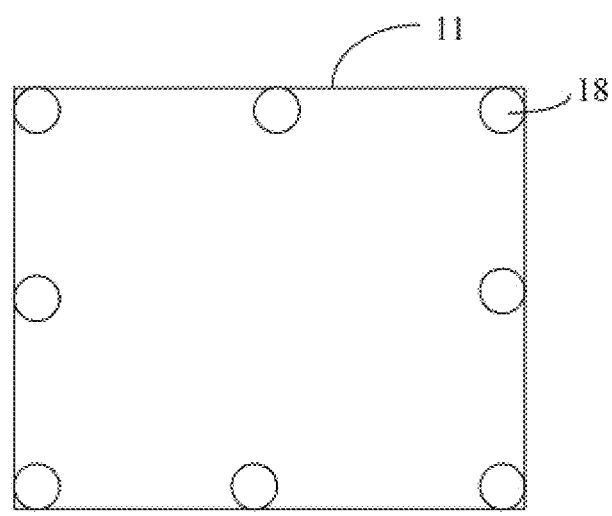
FIG. 12 is a schematic view of an embodiment of microphone array.

In FIG. 11, the local video communication device 10 can further include a speaker array 17. The speaker array 17 may be distributed on the back of the local translucent display device 11. The speaker array 17 may be used to play the remote user's voice according to the source location of the remote user. The speaker array 17 may also be arranged to be beyond the range of the local translucent display device 11 to simulate a sound source outside the field of view. The speaker array 17 allows the local user to have an immersive feeling. For example, if there is a cat howling near the remote video communication device 10', but the cat is out of the video screen, the local user can still hear the cat's voice. In FIG. 12, the local video communication device 10 may further include a plurality of stereo microphones 18, and the plurality of stereo microphones 18 is placed in front of the local translucent display device 11. The plurality of stereo microphones 18 is used to collect local sounds for transmission to each other.

The advantages of the local video communication device 10 may include, but are not limited to, the following. A camera is placed behind a translucent screen, and the camera may move following the position of the remote user's face image displayed on the translucent screen. Thus, when the local user looks at the position of the remote user's eyes image displayed on the translucent screen, the camera can capture the local user's face, and the local user and the remote user can look directly into each other's eyes. The local video communication device 10 provides users with an experience as if only a piece of transparent glass is placed between the local user and the remote user, which greatly increases the immersiveness. The local user and the remote user may feel like communicating with each other as if they are talking to each other on opposite sides of a glass.

Figure 13:
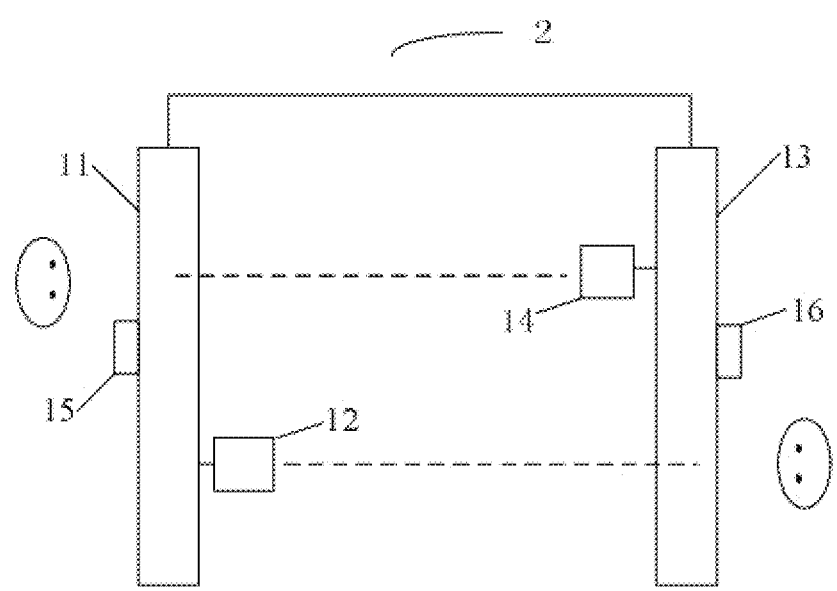
FIG. 13 is a schematic view of an embodiment of a video communication system.

In FIG. 13, another embodiment of a video communication system 2 is provided. The video communication system 2 comprises a local translucent display device 11, a local camera 12, a local identification device 15, a remote translucent display device 13, a remote camera 14 and a remote identification device 16. The local identification device 15 is placed on the local translucent display device 11. The local identification device 15 may be used to identify location information of the local user's face. The position of the local camera 12 may change with the movement of the remote user's image displayed on the local translucent display device 11, so that the position of the local camera 12 may always correspond to the position of the remote user's image. The remote identification device 16 is placed on the remote translucent display device 13. The remote identification device 16 is used to identify location information of the remote user's face. The position of the remote camera 14 may change with the movement of the local user's image displayed on the remote translucent display device 13, so that the position of the remote camera 14 may always correspond to the position of the local user's image.

The video communication system 2 is similar to the video communication system 1 in FIG. 1. Among the differences, the video communication system 2 includes the local identification device 15 and the remote identification device 16. The local identification device 15 may identify the location information of the local user and transmit the location information to the remote camera 14. The local camera 12 may be used to capture video information of the local user. The remote identification device 16 may identify the location information of the remote user and transmit the location information to the local camera 12. The remote camera 14 may be used to capture video information of the remote user. The local identification device 15 and the remote identification device 16 may include one or more optical cameras, infrared cameras, position detection units for use with position sensor worn by the user. In one embodiment, the local identification device 15 and the remote identification device 16 are both Kinect devices and used to identify the location information of the user eyes.

Figure 14:
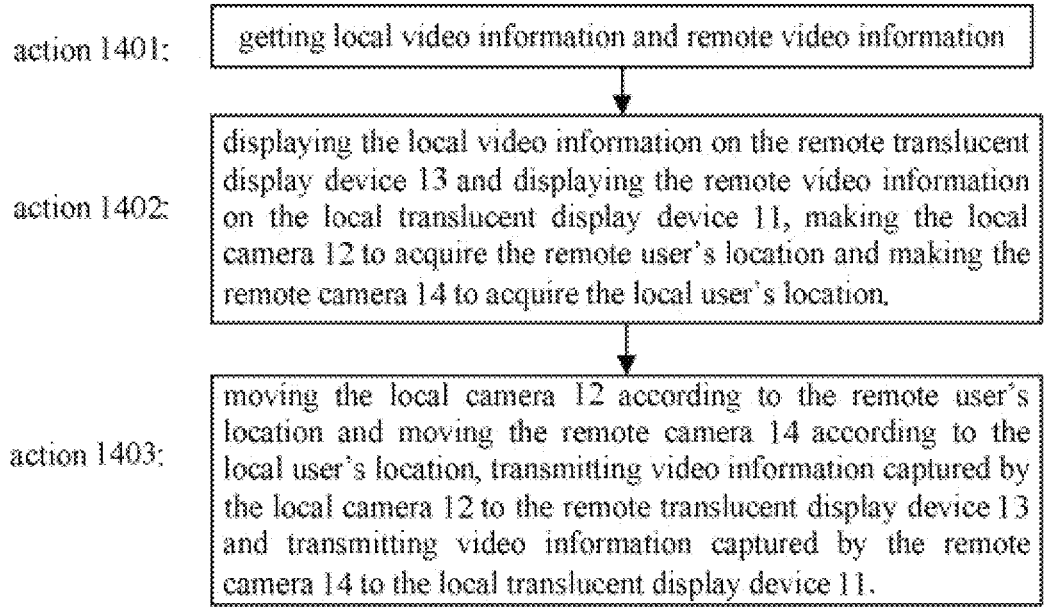
FIG. 14 is a flow chart of an embodiment of a method for video communication.

In FIG. 14, an embodiment of a method for video communication is provided. The method comprises:

action 1401, obtaining local video information and remote video information;

action 1402, displaying the local video information on the remote translucent display device 13 and displaying the remote video information on the local translucent display device 11, making the local camera 12 to obtain the remote user's location and making the remote camera 14 to obtain the local user's location;

action 1403, moving the local camera 12 according to the remote user's location and moving the remote camera 14 according to the local user's location, transmitting video information captured by the local camera 12 to the remote translucent display device 13 and transmitting video information captured by the remote camera 14 to the local translucent display device 11.

In action 1401, the local video information is captured by the local camera 12, and the remote video information is captured by the remote camera 14. The local camera 12 is placed on the back of the local translucent display device 11, and the local camera 12 may capture the local video information through the local translucent display device 11. The remote camera 14 is placed on the back of the remote translucent display device 13, and the remote camera 14 may capture the remote video information through the remote translucent display device 13. When a camera captures video information through a translucent display device, light emitted by the pixel does not enter the back of the translucent display device due to the obstruction of a light shielding layer under the pixel, and the camera cannot be disturbed. Therefore, during the operation of the translucent display device, the camera on the back of the translucent display device may also work in real time. In one embodiment, both the remote camera 14 and the local camera 12 may include binocular wide-angle cameras.

Figure 15:
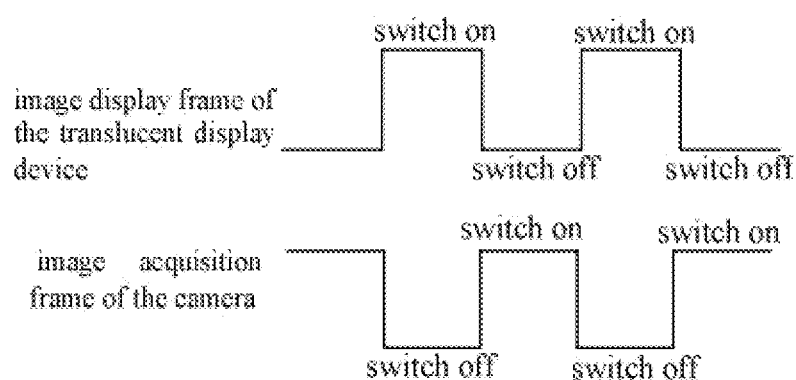
FIG. 15 is a working principle diagram of an image display frame of the translucent display and an image acquisition frame of cameras.

Furthermore, in order to make the camera work without interference of light, an image display frame of the translucent display device and an image acquisition frame of the camera can be staggered. In FIG. 15, the image display frame of the translucent display device and the image acquisition frame of the camera may be alternately performed one frame by one frame. When the image display frame is switched on, the image acquisition frame is turned off; when the image display frame is turned off, the image acquisition frame is switched on. Since the image display frame and the image acquisition frame are alternately performed very fast, and human eyes cannot distinguish, it does not affect human's video communication experience.

In action 1402, the local video information is captured by the local camera 12 and transmitted to the remote translucent display device 13, and the local user's location is also transmitted to the remote camera 14. The remote video information is captured by the remote camera 14 and transmitted to the local translucent display device 11, and the remote user's location is also transmitted to the local camera 12.

Figure 16:
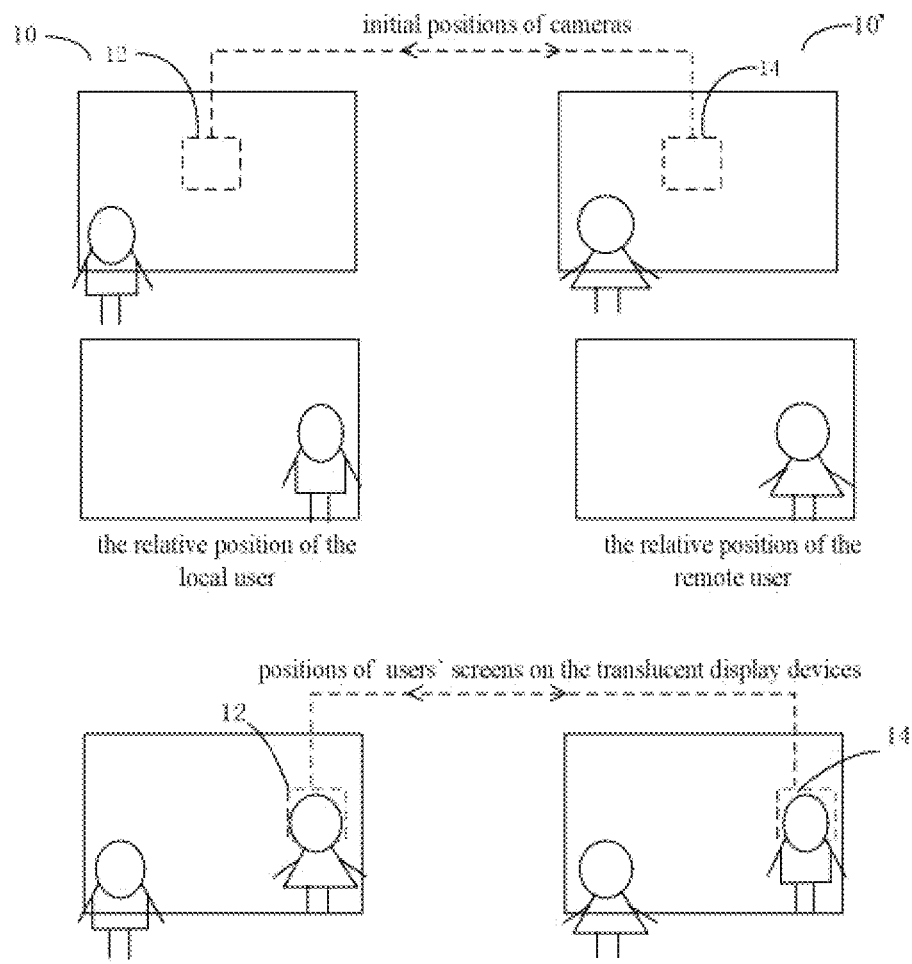
FIG. 16 is a schematic view of obtaining user's location information.

The user's location can be obtained by the following methods:

Method 1, a relative position of the user in video captured by the camera is obtained, and the position of the user according to the position of the camera and the relative position of the user is calculated. The "relative position of the user" means that the position of user in the video. In FIG. 16, it is assumed that the initial position of the local camera 12 is in the local translucent display device 11, and the initial position of the remote camera 14 is in the remote translucent display device 13. The local video communication device 10 may calculate the position the local user according to the relative position of the local user and the position of the local camera 12, then transmit the position of the local user to the remote camera 14. The remote video communication device 10' may calculate the position the remote user according to the relative position of the remote user and the position of the remote camera 14, then transmit the position of the remote user to the local camera 12.

Method 2, the position of the user by an identification device is obtained. The identification device can be placed in front of the translucent display device to identify the user's face.

In action 1403, the local camera 12 moves from the initial position to a corresponding location according to the remote user's location, so the position of the remote user's image on the local translucent display device 11 coincides with the corresponding location where the local camera 12 moves. When the local user looks at the position of the remote user's eyes image displayed on the local translucent display device 11, the local camera 12 may capture the local user's face, and the local user and the remote user can look directly into each other's eyes. Similarly, the remote camera 14 may also move to a corresponding location, and the remote user and the local user can look directly into each other's eyes.

Certainly, in a video communication process between two users, if one user leaves the field view of the camera, the camera corresponding to the user is no longer moving. For example, when the remote user leaves the room where the video communication system is located, which exceeds the field of view of the remote camera 14, the local camera 12 will not move. At the same time, the field of the video played by the remote translucent display device 13 is no longer changing. However, since the local user is still in front of the local translucent display device 11, the remote camera 14 still moves according to the location of the local user, and the local user can still see remote video information with different view fields.

In one embodiment, a method for video communication suitable for local video communication device 10 is provided. In FIG. 17, the method comprises: action 1701, obtaining remote video information from the remote video communication device 10';

action 1702, displaying the remote video information on the local translucent display device 11;

action 1703, acquire the position of remote user's image displayed on the local translucent display device 11;

action 1704, moving the local camera 12 to a position corresponding to the position of remote user's image displayed on the local translucent display device 11;

action 1705, capturing local video information by the local camera 12, and transmitting the local video information to the remote video communication device 10'.

In action 1701, in one embodiment, the remote video information is captured by the remote camera 14.

In action 1702, the local translucent display device 11 receives the remote video information through the communication module 104. And the remote video information can be processed by the video capture and processing module 101 and displayed on the local translucent display device 11 via the display module 105.

In action 1703, the position of remote user's image on the local translucent display device 11 can be calculated by the remote video communication device 10' and then be transmitted to the local video communication device 10. The remote user's image can also be first transmitted to the local video communication device 10, and then the position of remote user's image is calculated by the local video communication device 10.

In action 1704, the local camera 12 is moved to the position corresponding to the position of remote user's image on the local translucent display device 11 via the position control module 106.

When the local video communication device 10 includes the plurality of local cameras 12 arranged in a two-dimensional array, the plurality of local cameras 12 don't move. But only one or more of the plurality of local cameras 12 are selected for next step. The position of the one or more of the plurality of local cameras 12 corresponds to the position of remote user's image on the local translucent display device 11.

In action 1705, the local video information are transmitted to the remote video communication device 10' via the communication module 104.

The advantages of the method for video communication may include, but are not limited to, the following. The local user and the remote user can look at each other eye to eye while video communication by moving the cameras in real time. Thus, the method can increase the interactive experience of users. When the user moves in front of the translucent display device, the video information will be changed, and the user's immersion is increased.

Figure 18:
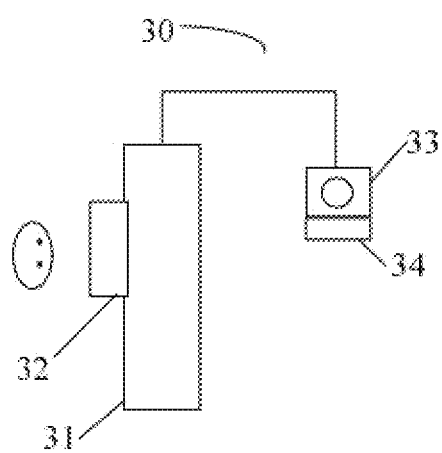
FIG. 18 is a schematic view of an embodiment of a window system.

In FIG. 18, an embodiment of a window system 30 based on video communication is provided. In at least one implementation, the window system 30 is one that allows a user to see other users and sceneries at a different location. The window system 30 comprises a local display 31, a local identification device 32, and a remote camera 33. The local identification device 32 is configured to identify a position of the local user's face, and transmit the position of the local user's face to the remote camera 33. The remote camera 33 is configured to capture remote video information according to the position of the local user's face. The local display 31 and the local identification device 32 can be set as a local terminal.

The local display 31 may be used to display the remote video information. The local display 31 may include a normal display such as LED display, LCD display. The local identification device 32 is placed on the local display 31. The local identification device 32 may include one or more optical cameras, infrared cameras, and/or position detection units for use with position sensor worn by the user. In one embodiment, the local display 31 may include an LED display, and the local identification device 32 may include a Kinect device.

The remote camera 33 is placed at a remote location and capable of capturing the remote video information at the remote location. The remote camera 33 may be a movable camera, an array of cameras in a plurality of different orientations, or a wide angle camera. Thus, the remote camera 33 may capture a wide range of scenes. If the remote camera 33 is a movable camera, the remote camera 33 may move in a similar manner to the local camera 12.

The window system 30 may further comprise an information processor 34. The information processor 34 may be connected to the local terminal and the remote camera 33. The information processor 34 may calculate a range of the local user's visual field according to the face location information of the local user, select video information captured by the remote camera 33 according to the local user's visual field, and transfer the video information back to the local display 31. Thus, the local user can see remote real-time scenes. Furthermore, the information processor 34 can calculate a range of the local user's visual field according to the eyes' location information of the local user. As the local user moves, the local identification device 32 can identify changes of the local user's position, and the video information transferred back to the local display 31 changes according to the local user's position. When the remote camera 33 includes a plurality of cameras arranged in a two-dimensional array, the information processor 34 may select one or more of the plurality of cameras corresponding to the face location of the local user, calculate the video information captured by the one or more of the plurality of cameras, and transmit the video information back to the local display 31. Thus, when the local user moves in front of the local display 31, the video scene seen by the local user may be different.

The window system 30 may further comprise a local speaker, a local lighting device and a local spray device. The local speaker, the local lighting device and the local spray device can be used in conjunction with the local display 31 to simulate sound, light, and air humidity in the remote scene. The microphone, photosensitive device, air humidity detector can also be set in the remote scene accordingly.

When the remote scene is a beach scene, after the window system 30 is turn on, the local user feels like on the beach. The local user can see the blue sea, hear the sound of the waves, and feel the sun and the humid air. Thus, the local user can have an immersive experience. When the local user moves, the remote scene seen by the local user is also changed, and the local user feels like walking on the beach.

Figure 19:
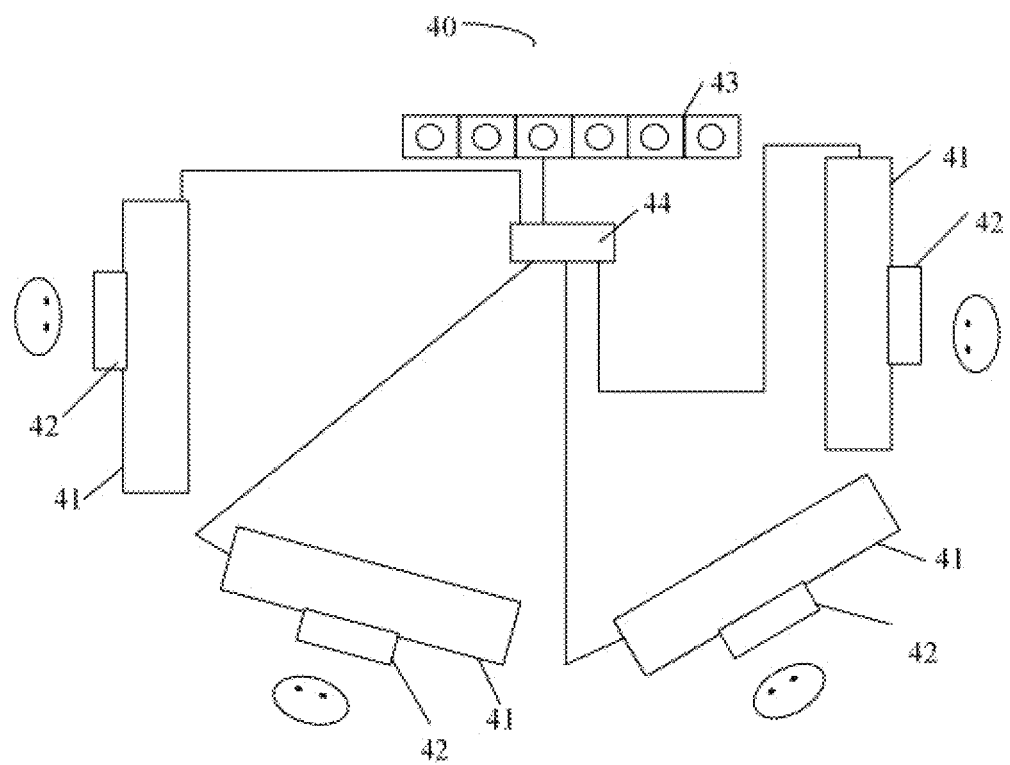
FIG. 19 is a schematic view of an embodiment of a window system.

In FIG. 19, an embodiment of a window system 40 based on video communication is provided. In at least one implementation, the window system 40 is one that allows a user to see other users and sceneries at a different location. The window system 40 may include a plurality of local displays 41, a plurality of local identification devices 42, a remote camera array 43 and an information processor 44. Each local display and each local identification device can be set as a local terminal. Each local identification device 42 may be configured to identify a position of the local user's face, and transmit the position of the local user's face to the information processor 44. The information processor 44 may be connected to a plurality of local terminals and the remote camera array 43. The information processor 44 may be used to calculate a range of the local user's visual field according to the position of the local user's face, select video information captured by the remote camera array 43 according to the local user's visual field. The remote camera array 43 may include a plurality of cameras arranged in an array. The information processor 44 may control the plurality of cameras to work simultaneously, select different video information with different angles, and transmit the different video information to the corresponding local display 41.

The window system 40 is substantially similar to the window system 30. Among the differences, the window system 40 includes the plurality of local displays 41. The information processor 44 may transmit video information to the plurality of local displays 41 according to each local user's visual field so that a plurality of local users can watch the video information at the same time. The plurality of cameras in the remote camera array 43 may respectively select different visual fields. Thus, the remote camera array 43 may simultaneously capture video information of different visual fields. Since positions of local users in front of each local display 41 may be different, the position information transmitted to the remote camera array 43 by the local identification devices 42 may also be different. The information processor 44 may calculate local user's visual field according to the position information and transmit video information to the plurality of local displays 41 according to each local user's visual field. The window system 40 may be simultaneously utilized by a plurality of local users at different places, and the plurality of local users can see different visual fields based on their different position information.

The advantages of the window system may include, but are not limited to, the following. The local user can watch different remote scenes according to different position information. The local user can interact with remote scenes in real time and have an immersive feeling.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

Depending on the embodiment, certain of the actions of methods described may be removed, others may be added, and the sequence of actions may be altered. The description and the claims drawn to a method may comprise some indication in reference to certain action. However, the indication used is only to be viewed for identification purposes and not as a suggestion for ordering the action.

What is claimed is:

1. A local video communication device comprising:
a local translucent display device configured to display remote video information from a remote video communication device; and
a plurality of local cameras configured to capture local video information;
wherein the plurality of local cameras is placed on the back of the local translucent display device, and the plurality of local cameras is arranged in a two-dimensional array, and the local translucent display device further comprises a micro processing unit, wherein the micro processing unit comprises:
a video capture and processing module configured to select one of the plurality of local cameras, that corresponds to a remote user's face image in the remote video information displayed on the local translucent display device, as a selected local camera, capture the local video information by the selected local camera, and process the local video information captured by the selected local camera;
a location acquisition module configured to obtain a local user's face location and a depth information between the local user and the local translucent display device;
a communication module configured to communicate with the remote video communication device;
a display module configured to adjust a field of the remote video information according to the local user's face location and the depth information and display the remote video information.

2. The device as claimed in claim 1, wherein the location acquisition module is configured to obtain the local user's eye location.

3. The device as claimed in claim 1, wherein the video capture and processing module is further configured to select the one of the plurality of local cameras, that corresponds to a remote user's eye image in the remote video information displayed on the local translucent display device, as the selected local camera.

4. The local video communication device of claim 1, wherein the local translucent display device comprises a display and a pellicle mirror.

5. The local video communication device of claim 1, wherein the local translucent display device comprises a projector and a translucent projection image.

6. The local video communication device of claim 1, further comprising a local identification device, the local identification device is configured to identify the location information of a local users' face and transmit the location information to the remote video communication device.

7. The local video communication device of claim 6, wherein the local identification device includes at least one of an optical camera, an infrared camera, and a wearable position sensor.

8. The local video communication device of claim 1, wherein the video capture and processing module is configured to control the plurality of local cameras to work simultaneously and only select and process the local video information captured by selected local camera.

9. The local video communication device of claim 1, wherein the video capture and processing module is configured to control only the selected local camera to work and process the local video information captured by the selected local camera.

10. A method for video communication of a local video communication device, the method comprising:
receiving remote video information from a remote video communication device;
adjusting a field of the remote video information according to a local user's face location and a depth information between the local user and a local translucent display device and displaying the remote video information on the local translucent display device;

acquiring a position of a remote user's image on the local translucent display device;

selecting a local camera corresponding to the position of the remote users' image from a local camera array as a selected camera; and transmitting local video information captured by the selected camera to the remote video communication device.

11. The method of claim 10, wherein an image display frame of the translucent display device and an image acquisition frame of the one or more local cameras are alternately performed one frame by one frame.

12. The method of claim 10, wherein the position of the remote user's image displayed on the local translucent display device is acquired by obtaining a relative position of the remote user in video captured by a remote camera and calculating the position of remote user's image displayed on the local translucent display device according to the position of the remote camera and the relative position of the remote user in video.

13. The method of claim 10, wherein the position of the remote user's image on the local translucent display device is acquired by an identification device in front of the remote translucent display device.

14. The method of claim 10, wherein a position of a remote user's face image on the local translucent display device is acquired.

15. The method of claim 10, wherein a position of a remote user's eye image on the local translucent display device is acquired.

* * * * *